United States Patent [19]

Georgopoulos

[11] Patent Number: 5,422,201
[45] Date of Patent: Jun. 6, 1995

[54] CURRENT COLLECTOR ASSEMBLY FOR AN ELECTROCHEMICAL CELL

[75] Inventor: Philip Georgopoulos, Westlake, Ohio

[73] Assignee: Eveready Battery Company, Inc., St. Louis, Mo.

[21] Appl. No.: 102,179

[22] Filed: Aug. 4, 1993

[51] Int. Cl.$^6$ .............................................. H01M 2/06
[52] U.S. Cl. ................................... 429/170; 429/171; 429/174; 429/181
[58] Field of Search ............... 429/165, 185, 171, 174, 429/170, 164, 172, 181

[56] References Cited

U.S. PATENT DOCUMENTS

| | | | |
|---|---|---|---|
| 3,740,271 | 6/1973 | Janmet et al. | 136/107 |
| 4,315,974 | 2/1982 | Athearn et al. | 429/185 X |
| 5,008,161 | 4/1991 | Johnson | 429/7 |
| 5,051,323 | 9/1991 | Murphy | 429/165 |

OTHER PUBLICATIONS

Drawing of a commercially available battery.

Primary Examiner—Anthony Skapars
Attorney, Agent, or Firm—Robert W. Welsh

[57] ABSTRACT

An electrochemical cell including a current collector assembly having a current collector, a seal and a compression means wherein the compression means and collector exert minimum tension and maximum compressive stresses on the seal thereby avoiding leakage of electrolyte either through or around the seal.

21 Claims, 3 Drawing Sheets

CURRENT COLLECTOR ASSEMBLY FOR AN ELECTROCHEMICAL CELL

FIELD OF THE INVENTION

This invention relates to a current collector assembly for an electrochemical cell and the cell containing the assembly.

BACKGROUND OF THE INVENTION

Cylindrical alkaline electrochemical cells commonly employ bobbin type constructions such that a centrally located anode is surrounded by a tubularly shaped cathode. Electrical connection to the anode is generally effected by the use of an elongated metal member, such as a nail, which is forcibly driven through a resilient nonconductive seal body that closes the open end of a cup-shaped container which houses electrochemically active components. One end of the collector protrudes above the seal for electrical connection to an external circuit. The shank of the collector is inserted into the anode where it functions as a current collector. A small portion of the collector resides within the seal body and is in sealing engagement therewith.

Prior to manufacturing a cell, the current collector and seal body are usually preassembled to form a current collector assembly. The seal assembly has a centrally located opening through which the collector protrudes. The outer edge of the seal body and the portion of the seal body which surrounds the centrally located opening are usually reinforced by thickening of the seal body's material. At least one portion of the seal body between the reinforced areas may be made thinner in cross-section than the reinforced areas so that the seal can rupture if the cell's internal pressure exceeds a predetermined limit.

The reinforced portion of the seal which surrounds and defines the centrally located opening is commonly referred to as the "hub". A current collector is inserted through the opening such that an interference fit exists between the seal's hub and the collector whose diameter is greater that the inside diameter of the seal body's opening. The objective is to create an inteference fit between the collector and hub such that electrolyte cannot escape from the cell by creeping along the surface of the collector. The extent of the interference must be carefully controlled. If the interference fit results in the creation of tangential tension which exceeds the seal hub's radial hoop strength, the seal will split and allow electrolyte to escape. If the interference fit is insufficient, electrolyte can creep along the surface of the collector and escape from the cell.

U.S. Pat. No. 3,740,271 discloses the use of a clamping ring arranged around the sleeve portion of the plug in order to exert compression on the conductive rod when it is inserted through the sleeve. The conductive rod is inserted into the opening on the exterior side of the plug and then driven through the plug and ring reinforced sleeve on the opposite (i.e. interior) side of the plug.

U.S. Pat. No. 5,008,161 discloses a cap assembly comprising a metallic sleeve which is surrounded on both sides by plastic and located on the interior surface of the seal body in order to compress the plastic against the collector and prevent leakage of electrolyte along the surface of the collector.

U.S. Pat. No. 5,051,323 discloses a conventional seal design in which the collector is inserted through the seal's central opening so that the upstanding wall which surrounds the collector is forced outward against a metal component known as the inner cover. Although the inner cover supports the outer circumference of the seal body, the collector exerts tangential tension against the seal's upstanding wall throughout the life of the collector assembly.

In another example, a commercially available battery discloses a flat metallic ring placed around the outer surface of the seal body. The seal is compressed between the collector and ring as the collector is forced through the seal body's central opening.

The prior art current collector assemblies have the following disadvantages. First, the seal bodies with no support around the hub (i.e. reinforced portion of the seal body through which the collector is inserted) are prone to leakage of electrolyte. This mode of seal failure is referred to as "hub splitting" since the hub splits due to the excessive tangential tension created by the interference fit between the collector and hub. Second, when a compression ring is used on the interior surface of the seal body such that the ring is exposed to the cell's components, the ring may react with one or more of the cell's components and generate gas within the cell. This gassing problem generally exists at an acceptably low level when mercury is used as a corrosion inhibitor in alkaline cells but the gassing becomes excessive when mercury is removed from the cell. The need for battery manufacturers to eliminate mercury precludes the use of a metallic compression ring inside the cell. Third, when the compression ring is located on the exterior of the seal and the collector is inserted in the seal body's opening from the exterior surface of the seal body, the insertion motion tends to drive the seal downward and out of the compression ring. This leads to improperly manufactured current collector assemblies that may allow electrolyte to creep along the surface of the collector when the assembly is incorporated into a cell.

While the known current collector assemblies have been used for many years, there is a need for an improved current collector assembly that simultaneously (1) imparts no tangential tension on the seal body's hub, thereby avoiding hub splitting and (2) provides sufficient radial compressive stress and tangential compressive stress on the seal's hub thereby preventing creepage of electrolyte along the surface of the collector. Preferably, the compression means is located outside the cell's internal environment in order to avoid gassing within the cell and the seal is driven into the compression means during the collector assembly manufacturing process.

SUMMARY OF THE INVENTION

The present invention is a current collector assembly for sealing electrochemically active components within a cup-shaped container and for collecting current from the components. The assembly comprises a resilient and electrically nonconductive seal body comprising an upstanding wall which defines an opening therethrough. A collector, inserted through the opening and into one of the electrochemically active components provides electrical continuity between the electrochemically active component and the exterior of the container. A compression means contacts the upstanding wall. The collector and compression means cooperate to exert radial compressive stress and tangential compressive stress on the upstanding wall after insertion of the collector through the opening compressed by the compression means while the tangential tension on the upstanding wall remains equivalent to the tangential tension on the wall prior to the insertion of the collector.

In another aspect, the present invention is a current collector assembly for sealing electrochemically active components within a cup-shaped container and for collecting current from the components. The assembly comprises a resilient and electrically nonconductive seal body comprising an upstanding wall which defines an opening therethrough. A collector, inserted through the opening and into one of the electrochemically active components, provides electrical continuity between the electrochemically active component and the exterior of the container. A compression element contacts the upstanding wall. The collector and compression element cooperate to exert radial compressive stress and tangential compressive stress on the upstanding wall after insertion of the collector through the opening compressed by the compression means while the tangential tension on the upstanding wall remains equivalent to the tangential tension on the wall prior to the insertion of the collector.

In yet another aspect, the present invention is an electrochemical cell comprising a container in which electrochemically active components are housed and sealed therein by a current collector assembly. The assembly comprises a resilient and electrically nonconductive seal body having an upstanding wall protruding from a surface and defining the perimeter of an opening through the seal body. An electrically conductive collector extends through the seal body's opening. The collector provides electrical continuity between the interior of the cell and the exterior of the cell. A compression means contacts the upstanding wall. The collector and compression means cooperate to exert radial compressive stress and tangential compressive stress on the upstanding wall while the tangential tension on the upstanding wall remains no greater than the tangential tension on the wall prior to insertion of the collector.

The seal assembly of this invention minimizes leakage of electrolyte from the cell via a path along the surface of the collector where it passes through the seal by exerting sufficient radial compressive stress and tangential compressive stress on that portion of the seal that contacts the collector. Splitting of the seal and the subsequent leakage of electrolyte is prevented by insuring that no tangential tension is exerted on the seal.

DETAILED DESCRIPTION OF THE INVENTION

Figure 1:
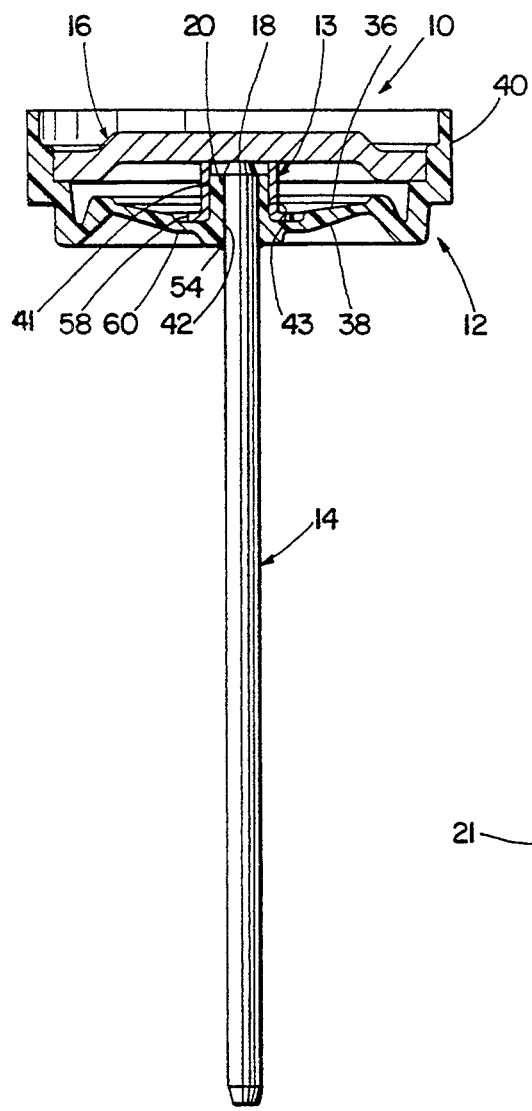
FIG. 1 is a cross sectional view of a current collector assembly of this invention.

Referring to the drawings, and more particularly to FIG. 1, there is shown a current collector assembly of this invention. The current collector assembly, generally designated 10, includes a seal body 12, a compression means 13 and a rod shaped current collector 14.

The seal body is generally shaped like a disk and made from electrically nonconductive material. This component has a top surface 36 and a bottom surface 38. A first upstanding wall 40 defines the circumferential boundary of the seal body. A second upstanding wall 41, located on the seal body's top surface 36, defines an opening 20 which is located near the central region of the seal body and connects top surface 36 to bottom surface 38. The opening is preferably circular. Second upstanding wall 41 has an inner surface 42 and an outer surface 43. Suitable materials from which the seal body may be manufactured include plastics, such as: nylon, polypropylene, filled polypropylene, and polysulfone. The preferred material is nylon.

The compression means 13, also known as a compression element, is a tubularly shaped metallic component. The inside diameter of the compression means is smaller than the original outside diameter of second upstanding wall 41. In this document, an original dimension of a part is defined as the "normal" dimension. Therefore, the original outside diameter of wall 41 is equivalent to the normal outside diameter of wall 41. One end of the compression means may be flared outwardly to create edge 58 against which a thinned portion 60 of seal body 12 may shear when the cell's internal pressure exceeds a predetermined pressure. Preferably, compression means 13 is longer than the second upstanding wall 41 so that compression means 13 directly contacts first external cover 16. Keeping the height of the upstanding wall less than the length of the compression means insures that the free end of second upstanding wall 41 will not get caught between first external cover 16 and compression means 13.

The current collector 14 is an elongated electrial conductor. Preferably, the collector is symmetrically shaped. Most preferably, the collector is shaped like a rod and has two identical ends. The sealing surface of the collector is preferably free of imperfections such as burrs, nicks and scratches. The use of collectors that are not symmetrical is acceptable provided the collector has one end. The middle portion of the collector may be made in curvilinear fashion and/or modified by altering the surface finish. Preferably, the collectors are made from wire that is cut to the required length. Each end may be slightly chamfered in order to remove small burrs and provide a lead-in to the seal. The materials from which the collector may be made include: brass, zinc, zinc alloys, nickel plated steel, tin plated steel and other electrically conductive materials that are stable in the cell's caustic environment. The preferred material is brass.

In the collector assembly process, compression means 13 is forced onto the outer surface 43 of the second upstanding wall 41 which is located on top surface 36 of seal body 12. The top surface 36 of seal body 12 is defined to be that surface which will face away from the interior of the cell when the collector assembly is assembled into a cell. The bottom surface 38 of seal body 12 will face toward the cell's interior. When the seal and compression means are mated, the compression means forces second upstanding wall 41 inwardly so that the inside diameter of opening 20 in seal body 12 is less than the diameter of collector 14 which will pass through opening 20. After the second upstanding wall 41 has been compressed, one end 18 of collector 14 is forced through the seal body's central opening 20 by inserting the collector into opening 20 from the seal body's bottom surface 38 and pushing end 18 of collector 14 through seal body 12 for a distance sufficient to expose a minor portion of the collector to the area above the seal thereby establishing electrical continuity between the area above the top surface 36 of seal body 12 and the area below the bottom surface 38 of seal body 12. Preferably, the collector is inserted less than one-quarter of its length through the seal body.

Insertion of collector 14 through seal opening 20 increases the radial compressive stress and tangential compressive stress on the seal body's second upstanding wall 41. Radial compressive stress is defined as the force per unit area that is exerted around upstanding wall 41 when the collector is inserted through the hub. This force is perpendicular to the upstanding wall. Tangential compressive stress is defined as the force per unit area that is exerted concentric with the exterior surface of the second upstanding wall 41 by the insertion of the collector through the hub. In addition to imparting sufficient radial compressive stress and tangential compressive stress to the hub, the collector and compression means must not exert a sufficient amount of tangential tension on the hub to cause the hub to split. Preferably, no tangential tension will be exerted on the hub after the collector assembly has been manufactured. Tangential tension is defined as the "pulling apart" force experienced by a unit area of the hub when the interference fit between the collector and hub results in the final diameter of the opening exceeding the normal diameter of the opening. In order to avoid imparting tangential tension to the hub, the diameter of collector 14 and the inside diameter of opening 20 defined by upstanding wall 41 must be selected such that: (1) very little or, preferably, no interference fit is created between the collector and the upstanding wall if the collector is inserted through the seal's opening prior to compressing the upstanding wall with the compression means and (2) a substantial interference fit must be created between the collector and the upstanding wall when the collector is inserted through the seal's opening after the upstanding wall has been compressed by the compression means. In other words, an interference fit that maintains or reduces the inside diameter of the opening in a compressed hub relative to the original or "normal" inside diameter of the seal's opening will not exert tangential tension on the hub. Preventing the creation of tangential tension effectively prevents splitting of the hub while compression of the hub between the compression means and collector creates a liquid tight seal between the collector and hub.

In order to quantify the amount of radial compressive stress, tangential compressive stress and/or tangential tension exerted on the seal, the dimensions of the seal prior to compression by the compression means and/or insertion of the collector are compared to the dimensions of the seal after the upstanding wall has been compressed and the collector inserted. The extent of stress and/or tension can be calculated by procedures well known in the field of mechanical engineering.

A sealant 54 may be applied to the collector's circumferential surface near the leading end 18 of collector 14 prior to forcing that portion of the collector through the seal. Alternatively, the sealant may be applied to the inner surface of the seal body's opening. The action of inserting collector 14 into the seal's opening 20 results in the smearing of a thin film of sealant along the interface between the collector and seal body. If a slight excess of sealant is used, a circular bead of the sealant will be formed at the junction of current collector 14 and the inside surface 38 of seal body 12. Suitable materials include asphalt, polyamides and polyacrylics.

Figure 2:
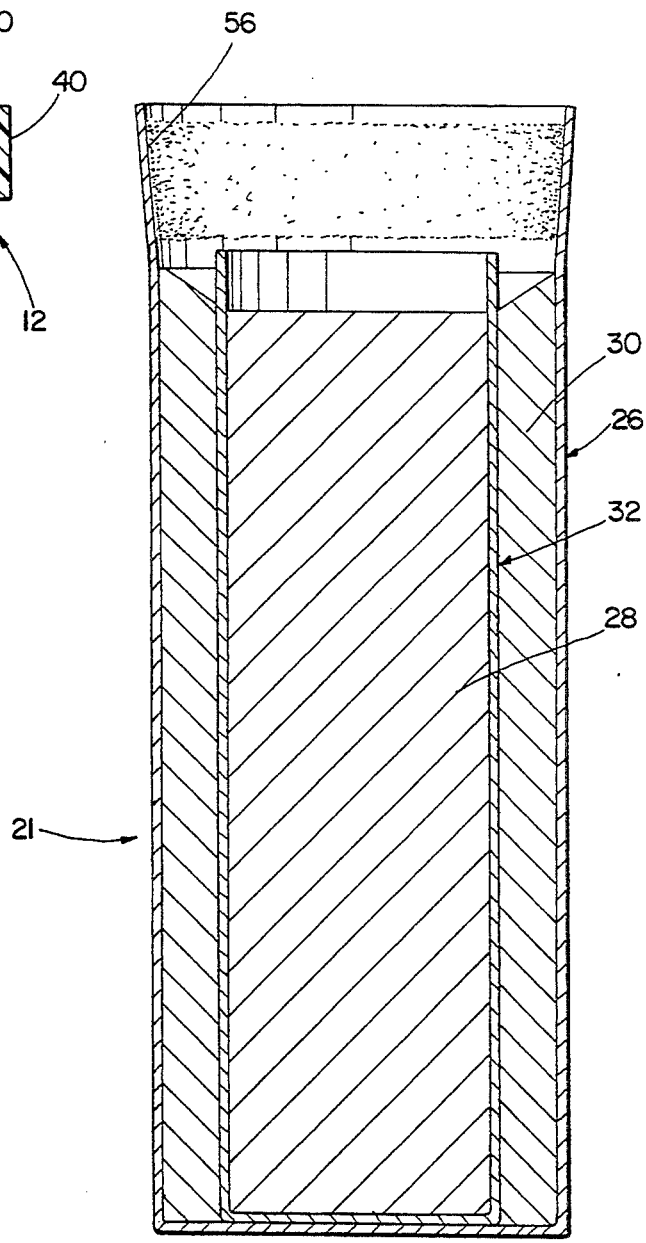
FIG. 2 is a cross sectional view of a subassembly which forms a part of an alkaline electrochemical cell.
Figure 3:
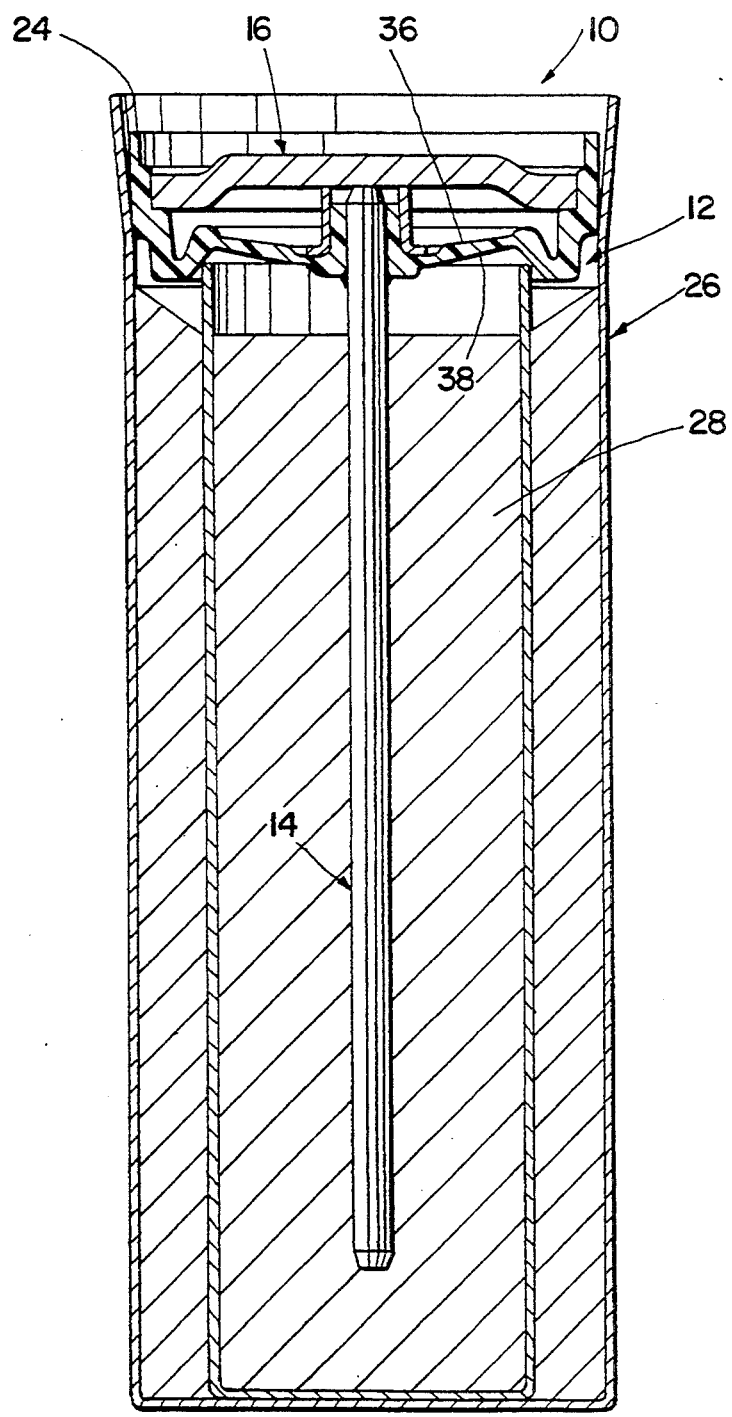
FIG. 3 is a cross sectional view of a partially assembled cell.

FIG. 2 shows a subassembly, generally designated 21, into which the current collector assembly shown in FIG. 1 is inserted in order to manufacture the partially assembled battery shown in FIG. 3. Referring to FIG. 3, the subassembly contains a first electrochemically active material 30, such as manganese dioxide, and a second electrochemically active material 28, such as zinc. In addition, separator 32 is located between the electrochemically active materials. Electrolyte, such as potassium hydroxide, contacts both electrochemically active materials. These components are arranged to generate an electrical current when an electrically conductive path is established between the first electrochemically active material and the second electrochemically active material. A tacky substance 56, such as asphalt, may be applied to the inner top surface of container 26 to serve as a barrier against creepage of the cell's electrolyte along the container's surface.

Shown in FIG. 3 is a partially assembled cell including a current collector assembly 10 inserted into the open end 24 of the subassembly's container 26. The current collector assembly's seal body 12 closes the open end of container 26. The portion of collector 14 which extends from the bottom surface 38 of seal body 12 is inserted into the powdered zinc mixture 28 located within the subassembly thereby establishing electrical continuity between the zinc and the portion of the collector which is exposed to the area above the seal body's top surface 36. A first external cover 16 may be welded to the exposed end of the current collector thereby forming the cell's negative terminal.

Figure 4:
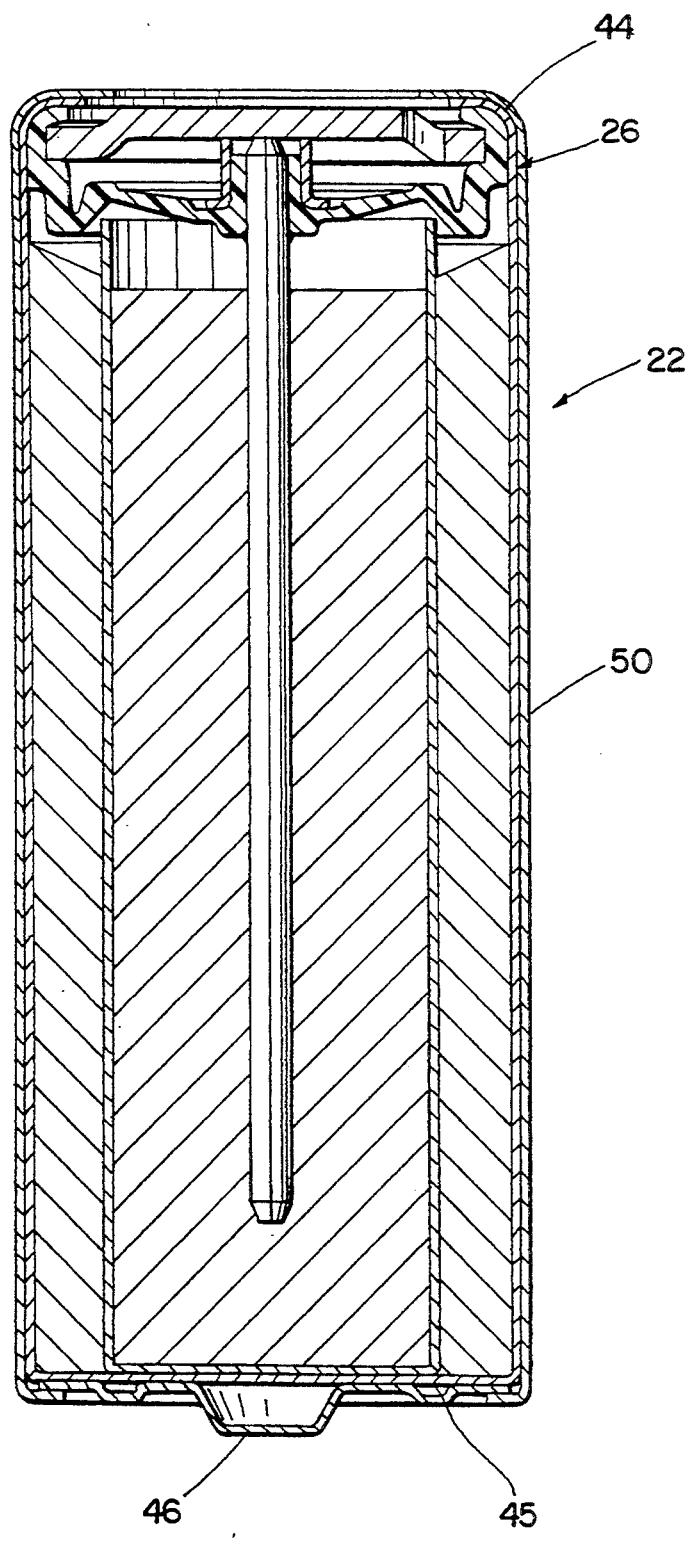
FIG. 4 is a cross sectional view of a cell of this invention.

As shown in FIG. 4, the rim 44 of container 26 is crimped inwardly toward the seal body to form a hermetic seal. The resulting electrochemical cell, generally designated 22, is capable of generating an electric current when an electrically conductive path is established between the container and the portion of the collector exposed to the area above the seal body's top surface. The battery may be finished by welding a second external cover 46 to the closed end 45 of container 26 thereby forming the battery's positive terminal. A label 50 may be secured to the cell's circumferential surface.

It is thought that the current collector assembly and electrochemical cell containing the same will be understood from the foregoing description. Further, various changes in the form, construction and selection of materials may be made without departing from the spirit and scope of the invention as the form and materials described herein are merely preferred embodiments.

I claim:

1. A current collector assembly for sealing electrochemically active components within a cup-shaped container and for collecting current from the components, said assembly comprising:
    a) a resilient and electrically nonconductive seal body having an upstanding wall defining an opening therethrough;
    b) a collector inserted through the opening and into one of the electrochemically active components, wherein said collector provides electrical continuity between the electrochemically active component and the exterior of the container; and
    c) a compression means contacting the upstanding wall, wherein said collector and said compression means cooperate to exert radial compressive stress and tangential compressive stress on the upstanding wall after insertion of said collector through the opening compressed by said compression means while the tangential tension on the upstanding wall remains equivalent to the tangential tension on the wall prior to the insertion of said collector.

2. A current collector assembly, as recited in claim 1, wherein said seal body comprises a bottom surface, a top surface and said upstanding wall protrudes from the top surface.

3. A current collector assembly, as recited in claim 2, wherein the upstanding wall comprises an inner surface, an outer surface and said compression means contacts the outer surface of the upstanding wall.

4. A current collector assembly, as recited in claim 1, wherein said seal body is disk shaped and said opening is circular.

5. A current collector assembly, as recited in claim 4, wherein said body is made from material selected from the group comprising: nylon, polypropylene and filled polypropylene.

6. A current collector assembly, as recited in claim 1, wherein a portion of said compression means extends beyond the end of the upstanding wall.

7. A current collector assembly, as recited in claim 1, wherein said compression means is an eyelet.

8. A current collector assembly, as recited in claim 1, wherein said compression means is tubularly shaped.

9. A current collector assembly, as recited in claim 1, wherein said collector is symmetrically shaped.

10. A current collector assembly, as recited in claim 9, wherein said collector has two identical ends.

11. A current collector assembly, as recited in claim 10, wherein a minor portion of said collector is exposed to the area above the seal body's upstanding wall.

12. An electrochemical cell comprising a container in which electrochemically active components are housed and sealed therein by a current collector assembly, said assembly comprising:
 a) a resilient and electrically nonconductive seal body having an upstanding wall protruding from a surface and defining an opening through said seal body;
 b) an electrically conductive collector extending through the opening in said seal body thereby providing electrical continuity between the interior of the cell and the exterior of the cell; and
 c) a compression means contacting the upstanding wall, wherein said compression means and said collector cooperatively exert radial compressive stress and tangential compressive stress on the upstanding wall while the tangential tension on the upstanding wall remains no greater than the tangential tension on the wall prior to the insertion of said collector.

13. An electrochemical cell, as recited in claim 12, wherein said seal body comprises a bottom surface, a top surface and said upstanding wall protrudes from the top surface.

14. An electrochemical cell, as recited in claim 12, wherein the upstanding wall comprises an inner surface, an outer surface and said compression means contacts the outer surface of the upstanding wall.

15. A current collector assembly for sealing electrochemically active components within a cup-shaped container for collecting current from the components, said assembly comprising:
 a) a resilient and electrically nonconductive seal body having an upstanding wall defining an opening therethrough;
 b) a collector inserted through the opening and into one of the electrochemically active components, wherein said collector provides electrical continuity between the electrochemically active component and the exterior of the container; and
 c) a compression element contacting the upstanding wall, wherein said collector and said compression element cooperate to exert radial compressive stress and tangential compressive stress on the upstanding wall after insertion of said collector through the opening compressed by said compression means while the tangential tension on the upstanding wall remains equivalent to the tangential tension on the wall prior to the insertion of said collector.

16. A current collector assembly for sealing electrochemically active components within a cup-shaped container and for collecting current from the components, said assembly comprising:
 a) a resilient and electrically nonconductive seal body having an upstanding wall defining an opening therethrough;
 b) a compression means contacting the upstanding wall, said compression means having an inside diameter less than the normal outside diameter of said seal body's upstanding wall; and
 c) a collector inserted through the opening in said seal body, said collector having a diameter no greater than the inside diameter of the opening in said seal body prior to compression by said compression means, said compression means and said collector cooperating to exert radial compressive stress and tangential compressive stress on the upstanding wall after insertion of said collector through the opening compressed by said compression while the tangential tension on the upstanding wall remain equivalent to the tangential tension on the wall prior to the insertion of said collector.

17. A current collector assembly, as recited in claim 16, wherein said seal body comprises a bottom surface, a top surface and said upstanding wall protrudes from the top surface.

18. A current collector assembly, as recited in claim 17, wherein the upstanding wall comprises an inner surface, an outer surface and said compression means contacts the outer surface of the upstanding wall.

19. An electrochemical cell comprising a container in which electrochemically active components are housed and sealed therein by a current collector assembly, said assembly comprising:
 a) a resilient and electrically nonconductive seal body having an upstanding wall protruding from a surface and defining an opening through said seal body;
 b) a compression means contacting the upstanding wall, said compression means having an inside diameter less than the normal outside diameter of said seal body's upstanding wall; and
 c) a collector inserted through the opening in said seal body, said collector having a diameter no greater than the inside diameter of the opening in said seal body prior to compression by said compression means, said compression means and said collector cooperating to exert radial compressive stress and tangential compressive stress on the upstanding wall after insertion of said collector through the opening compressed by said compression while the tangential tension on the upstanding wall remain equivalent to the tangential tension on the wall prior to the insertion of said collector.

20. An electrochemical cell, as recited in claim 19, wherein said seal body comprises a bottom surface, a top surface and said upstanding wall protrudes from the top surface.

21. An electrochemical cell, as recited in claim 19, wherein the upstanding wall comprises an inner surface, an outer surface and said compression means contacts the outer surface of the upstanding wall.

* * * * *